United States Patent
Tohyama et al.

(10) Patent No.: US 6,995,880 B2
(45) Date of Patent: Feb. 7, 2006

(54) IMAGE READING APPARATUS

(75) Inventors: Tetuyuki Tohyama, Yamanashi-ken (JP); Masaki Fukuda, Yamanashi-ken (JP)

(73) Assignee: Nisca Corporation, Yamanashi-Ken (JP)

(*) Notice: Subject to any disclaimer, the term of this patent is extended or adjusted under 35 U.S.C. 154(b) by 824 days.

(21) Appl. No.: 09/961,054

(22) Filed: Sep. 24, 2001

(65) Prior Publication Data

US 2002/0036809 A1     Mar. 28, 2002

(30) Foreign Application Priority Data

Sep. 25, 2000  (JP) .............................. 2000-289715

(51) Int. Cl.
  *H04N 1/04*   (2006.01)
  *B65H 5/00*   (2006.01)
  *B65H 5/02*   (2006.01)
(52) U.S. Cl. .................. 358/496; 358/497; 358/474; 358/498; 271/264; 271/272
(58) Field of Classification Search ............... 358/496, 358/497, 474, 498; 271/264, 272
See application file for complete search history.

(56) References Cited

U.S. PATENT DOCUMENTS

| 5,280,368 A | * | 1/1994 | Fullerton | 358/474 |
| 5,488,485 A | * | 1/1996 | Amemiya | 358/444 |
| 5,826,133 A | * | 10/1998 | Saito et al. | 399/2 |
| 6,323,933 B1 | * | 11/2001 | Anzai | 355/23 |

FOREIGN PATENT DOCUMENTS

| JP | 3-240361 | 10/1991 |
| JP | 9-46484 | 2/1997 |
| JP | 11-136444 | 5/1999 |

* cited by examiner

*Primary Examiner*—Edward Coles
*Assistant Examiner*—Houshang Safaipour
(74) *Attorney, Agent, or Firm*—Manabu Kanesaka

(57) ABSTRACT

An image reading apparatus for reading both surfaces of a document has a first reading device and a second reading device disposed at a side opposite to the first reading device to sandwich a reading station for reading the document, thereby simultaneously reading both surfaces of the document transported to the reading station. The reading station includes a first path to guide the document to be read by the first reading device and a second path for guiding the document to be read by the second reading device. A gap in the second path is narrower than a gap in the first path. This structure does not cause document transport problems and attains quality readings of both surfaces of the document while having different optical reading means.

15 Claims, 7 Drawing Sheets

IMAGE READING APPARATUS

BACKGROUND OF THE INVENTION AND RELATED ART STATEMENT

This invention relates to an image reading apparatus for scanning and optically reading a document image and outputting the scanned indicia as electronic data. More particularly, this invention relates to an image reading apparatus equipped with two optical reading means for reading images on the front and back surfaces of the documents or sheets fed one at a time from a document supply tray by an automatic document feeder commonly known as an ADF.

Image reading apparatuses, normally called scanners, optically read the image of a document and convert the image into electronic data and transmit it to image forming apparatuses, such as personal computers, copy machines or facsimiles. Image forming apparatuses are also normally equipped with the following types of image reading apparatuses.

Image reading apparatuses have reading means for reading the images on the documents or sheets transported one at a time from a document supply tray by an automatic document feeder. Recent image reading apparatuses have been proposed to have a function using two individual reading means to read the images on the front and back surfaces of the document sheets fed one at a time by an automatic document feeder located on one document transport path without locating the sheet in a switch-back path.

Generally, such an image reading apparatus employs an optical reduction reading means that has a depth of focus of approximately 10 mm to read the indicia on one surface of a document and a contact image sensor that has a depth of focus of approximately 0.6 mm to read the other surface of the document.

Examples of the image reading apparatuses that are equipped with two reading means to read indicia on the front and back surfaces of a document are Japanese Patent Publications (KOKAI) No. 9-46484, No. 3-240361 and No. 11-136444.

In Japanese Patent Publication No. 9-46484, disclosed is a reading apparatus interposed between transfer rollers to transfer documents or sheets between two reading means. However, when such a basic configuration is employed, the apparatus becomes larger, and because the ADF can not be opened or closed, means for placing and reading a thick book type document can not be placed at the same time.

Japanese Patent Publication No. 3-240361 discloses a reading apparatus including optical reduction reading means to read the bottom surface of a document or sheet, and reading means of a contact image sensor to read the top surface of the sheet, with individual transport rollers (23 and 24) established at the reading positions of the respective reading means to press the sheet toward each of the reading means.

Japanese Patent Publication No. 11-136444 also uses optical reduction reading means to read the bottom surface of a sheet and reading means of a contact image sensor to read the top surface of the sheet. The transport roller (72) is located just before the reading position of the reading means above the document sheet transport path to feed the sheets. Further disclosed is an image reading apparatus provided with a backup roller (74) in a position opposing the image reading position of the reading means of the optical reduction for pressing the sheet toward the image reading sensor.

The image forming apparatuses of the past for reading images on the front and back surfaces of the sheet have all used transport rollers or backup rollers and have employed a configuration to transport the sheets so that they are pressed against the reading surface or contact glass of the respective reading means that are formed at opposite sides. This is because it is required to transport the sheets through gaps that have different depths of focus for the two types of reading means to enable precise reading of the sheets without the images becoming out of focus when using two individual reading means to read both front and back surfaces of the sheets transported by the automatic document feeder apparatus.

Of particular note, the contact image sensor reading means has a smaller tolerance for the reading space between the sheet and the reading means in comparison to the optical reduction reading means that uses a CCD. So, the tolerance of the gap between the sheet and the image sensor must be strictly maintained.

Japanese Patent Publication No. 11-32164 teaches a reading apparatus forming a transport path having in the contact image sensor reading means a depth of focus in the transport path gap for the reading units of both reading means in place of using transport rollers to press the sheet against the contact glass.

All of the image reading apparatuses of the three described in the prior art are complex in structure and are large because they use transport or backup rollers near the image reading apparatuses in the transport paths. Furthermore, because the sheets transported in such apparatuses receive the driving force in the direction of travel and the vertical direction pressing force while being sandwiched between the pair of the transport rollers, the pressure applied to the sheet is dramatically changed from the time when the document sheet is between the pair of the transport rollers and when released from between the pair of the transport rollers, particularly with thicker document or sheet. Thus, it is not always possible to maintain the gap in the tolerance range between the document sheet and the reading surface. Furthermore, depending upon the pressure of the transport roller, the contact glass can become dirty because the document sheet comes to contact with the glass under the pressure of the rotating outer surface of the roller. Such problems are particularly undesirable for the optical devices.

The image reading apparatus disclosed in Japanese Patent Publication No. 11-136444 has a configuration for feeding the document or sheet by the pair of transport rollers (72) to the reading positions of the contact image sensor and optical reduction reading means, so there is a possibility of the sheet flapping in the vertical direction thereby making it impossible to ensure that the sheet image can be read precisely.

Also, if the gaps are adjusted to be the same for the reading units for both reading means, the focus for reading with the contact image reading means will be incorrect when the depth of focus is set to the standard of the optical reduction reading means. On the other hand, if setting the standard on the depth of focus of the contact image reading means, as in Japanese Patent Publication No. 11-32164, the gap in the sheet transport path becomes narrower, causing the sheets to travel for a greater distance in such a narrow gap thereby increasing the possibility of the problems like document sheet jams.

To make the image reading apparatus lighter and more compact, it is necessary to arrange the reading position for reading one or front surface of a document sheet and the reading position for reading the other or back surface of the document sheet as closely as possible without separation.

In view of these points, the image reading apparatuses in the prior art are insufficient in ensuring stability in the transfer of both front and back surfaces of the document or sheet with respect to the reading means reading surface, reducing the number of components for forming such apparatus and simplifying the structure.

An object of the present invention is to alleviate the problems of the image reading apparatuses of the past and to provide an image reading apparatus that limits the use of transport rollers and backup rollers, simplifies the structure and employs a compact image reading apparatus while attaining precise image data of the images on both front and back surfaces of the document or sheet by ensuring the stable transfer of the sheet on the reading means reading surfaces in each of the gaps that have different depths of focus tolerances for the front and back surfaces of the sheet with respect to the image sensors.

SUMMARY OF THE INVENTION

An image reading apparatus of the invention reads the indicia on the front and the back surfaces of documents or sheets automatically fed one at a time. The image reading apparatus includes first reading means for reading one surface of a document, second reading means for reading the other surface of the document, a reading station for reading the document by the first reading means and the second reading means, a document supply tray for placing the documents to be fed for reading, document feed means for feeding the documents on the document supply tray to the reading means formed at an upstream side of the reading station, and discharge means for discharging the documents from the reading means formed at a downstream side of the reading stations.

The reading station comprises transparent first guide means for reading one surface of the document by the first reading means, second guide means situated at a side opposite to the first reading means to form a first path together with the first guide means having a predetermined gap therebetween, transparent third guide means for reading the other surface of the document by the second reading means, and fourth guide means formed at a side opposite to the third guide means. The fourth guide means forms a second path having a gap smaller than the predetermined gap together with the third guide means.

DETAILED DESCRIPTION OF THE PREFERRED EMBODIMENT

The following is a detailed explanation of the preferred embodiments of the present invention based on the figures provided.

Figure 1:
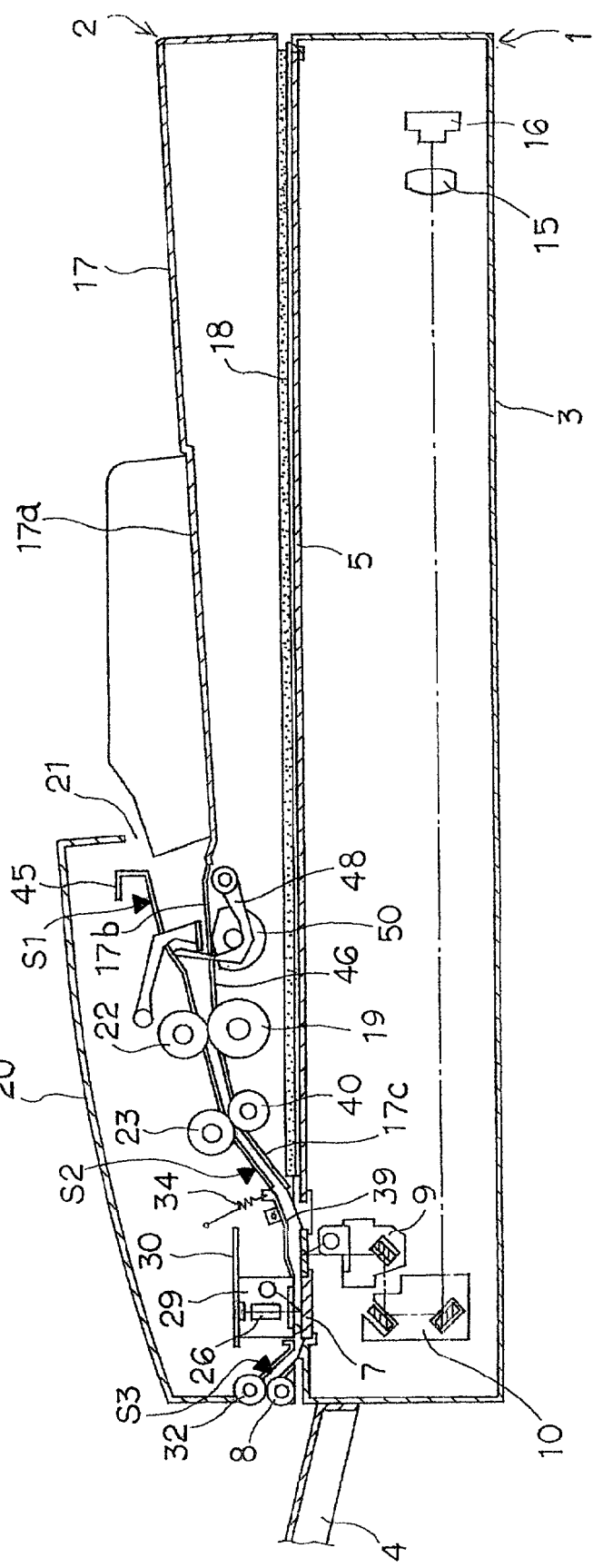
FIG. 1 is a longitudinal sectional view of the entire structure of an image reading apparatus according to a first embodiment of the invention.
Figure 2:
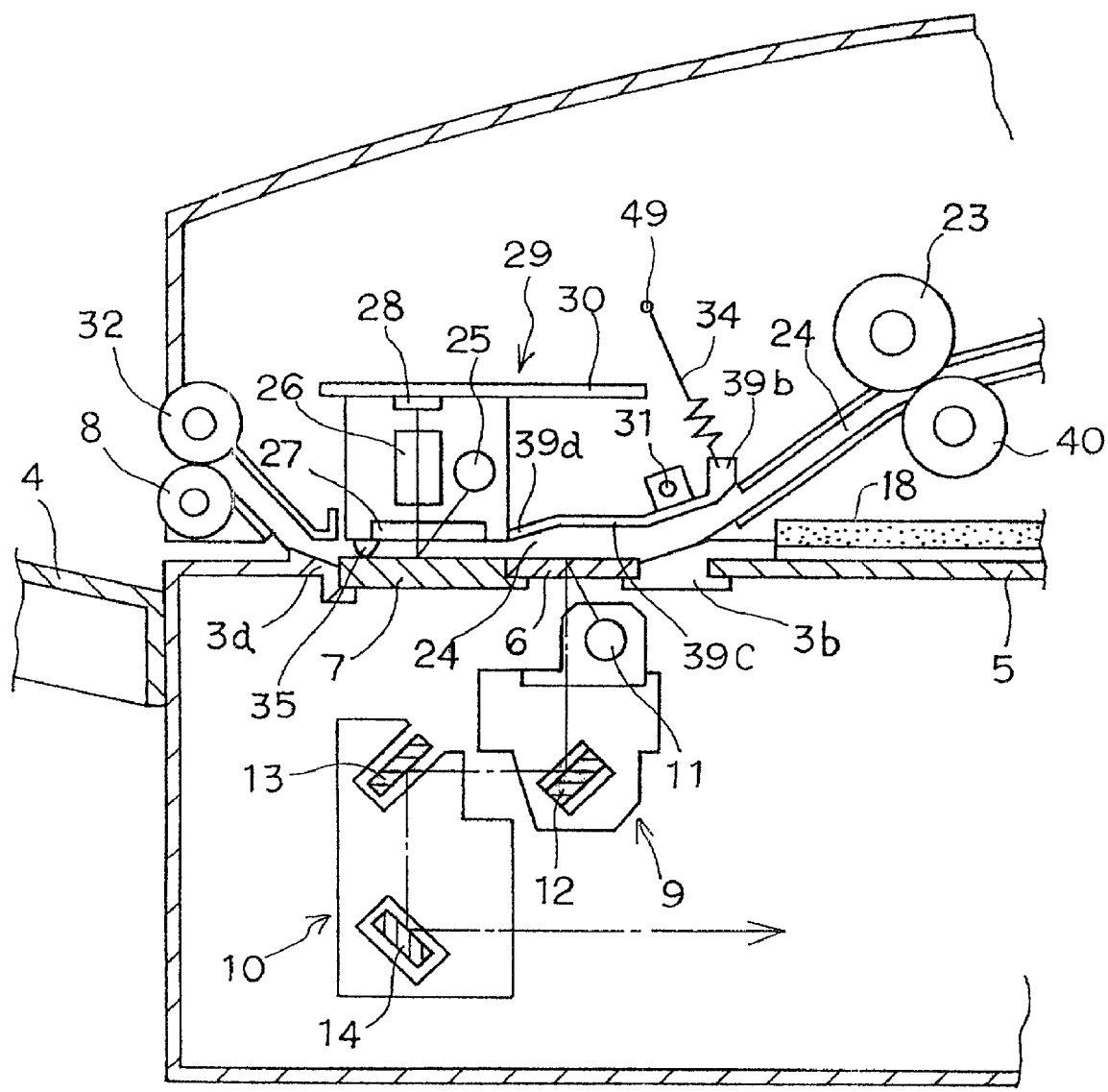
FIG. 2 is an enlarged sectional view of the essential members of the embodiment shown in FIG. 1.
Figure 3:
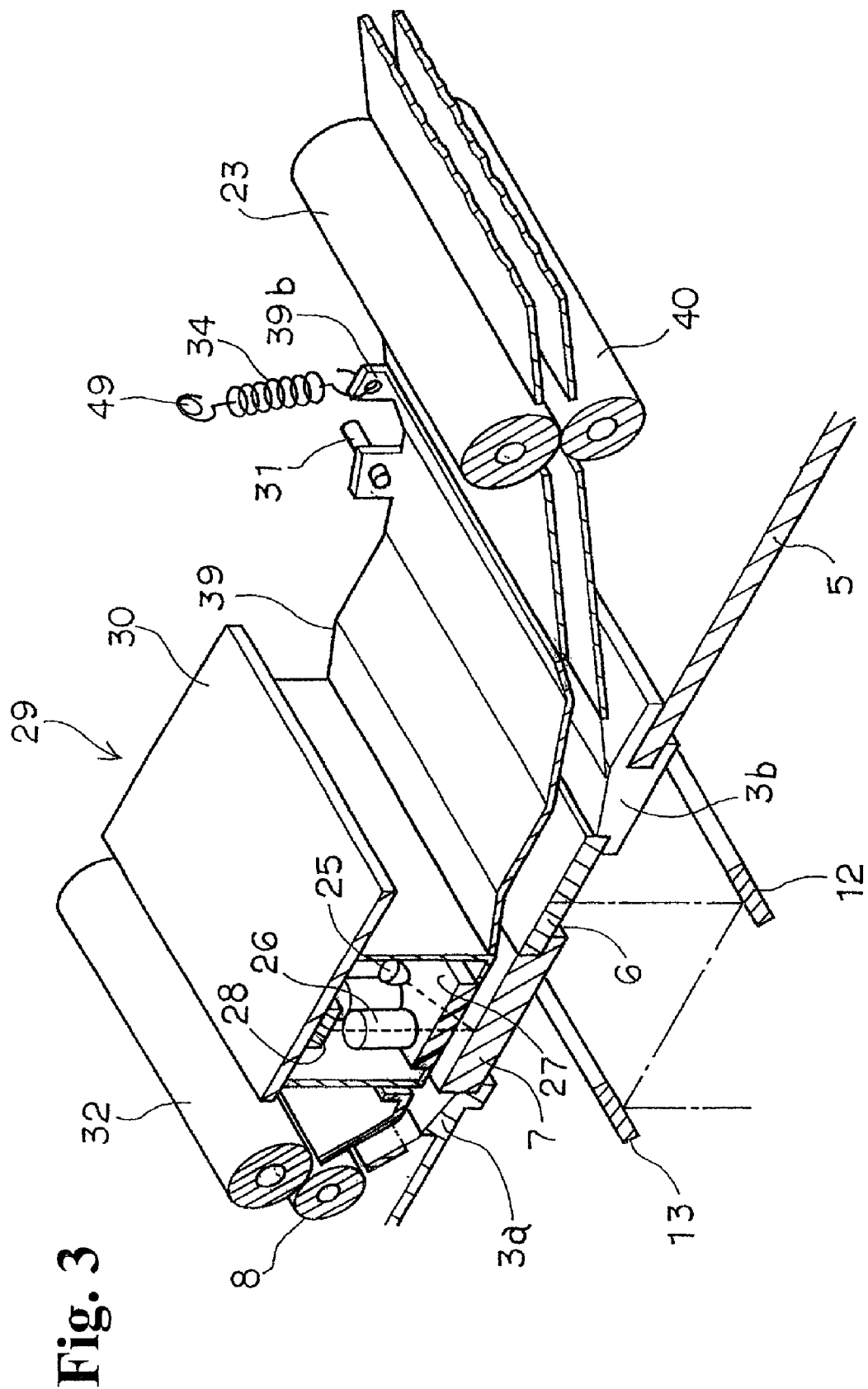
FIG. 3 is a perspective view including a CIS unit shown in FIG. 2.
Figure 4:
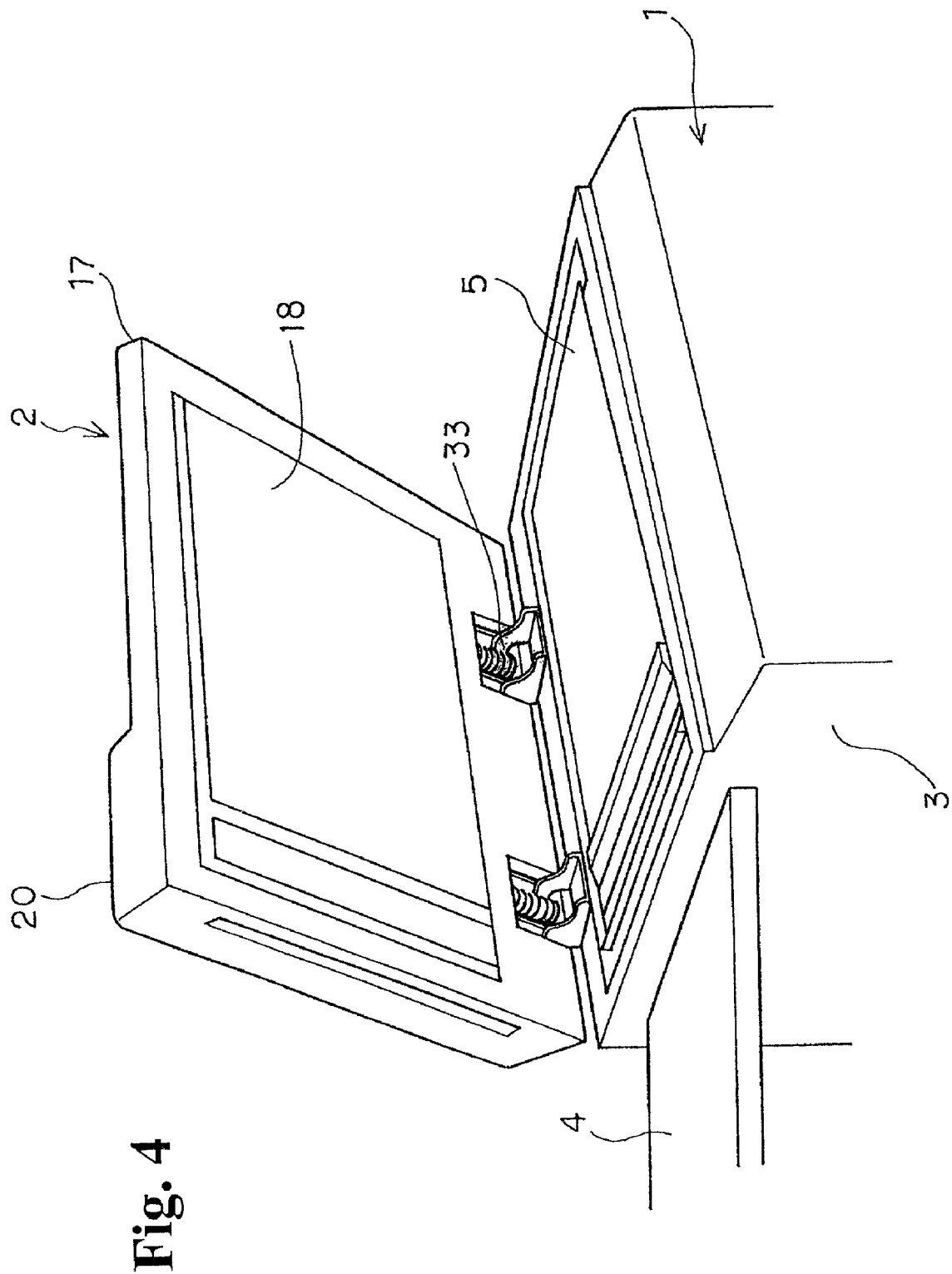
FIG. 4 is a perspective view showing an upper unit of the image reading apparatus according to the embodiment shown in FIG. 1 in an open state.

FIG. 1 is a longitudinal sectional view of the entire structure of the image reading apparatus according to the first embodiment of the invention. FIG. 2 is an enlarged sectional view of the essential members of FIG. 1. FIG. 3 is a perspective view of the essential members of FIG. 2. FIG. 4 is a perspective view from the front of FIG. 1 showing the upper unit of the image reading apparatus according to this embodiment with the top open.

In FIG. 1 to FIG. 4, numeral 1 refers to a main unit. An upper unit 2 is mounted to the main unit 1 by a hinge 33 (shown in FIG. 4) to open upwardly. The outer side of the unit 1 is formed by a frame 3, and a discharge tray 4 is fastened to one side of the frame 3. Also, on the upper side of the frame at the opposite side of the discharge tray 4, a platen 5 is incorporated, which is a transparent glass plate for placing a thick original for reading when the upper unit 2 is opened in the upper direction as shown in FIG. 4.

Also, on the opposite side of the platen 5 relative to the fastening unit fixing section 3b, which is a part of the frame 3 to fasten the platen 5, a guide 6 which is a transparent glass plate for supporting the document for reading the images on the document fed one sheet at a time, and a guide 7 which is formed of a non-transparent white material for supporting the document for reading the images on the document similarly fed one sheet at a time, are incorporated into one unit. The fastening unit 3b fastens the guide 6 to the notched portion on the edge of the guide 6. Also, on the upper surface of the frame 3, the fastening unit 3a is formed to fasten the guide 7 in the same way as the fastening unit 3b. The guide 6 side edge of the guide 7 is formed with a notch of equivalent thickness as that of the guide 6 to abut against the guide 6 for fastening. In this way, the edges of the guides 6 and 7 are both supported by the fastening units 3a and 3b, and the other edges are each fastened to other edges. Their upper surfaces are fastened to the frame 3 to form a single flat surface.

A pair of discharge rollers 8 and 32 is disposed on the end of the upper unit 2 on the discharge tray 4 side to discharge the documents or sheets. The discharge roller 8 is driven by a motor that is not shown in the drawings.

The frame 3 houses an optical reduction reading means (first reading means) to read and reduce images and to convert them into electrical signals. Numerals 9 and 10 are carriages that form a part of the optical reduction system reading means and are interlocked to maintain a prescribed distance relationship while being driven by a motor that is not shown in the drawings. In other words, the carriage 10 moves at half of the displacement of the carriage 9 inside the frame 3 in the left and right directions of the drawing. On the carriage 9 either in a fixed position or during movement, there are mounted a light source 11 for producing light to illuminate the document and a reflecting mirror 12 for receiving light reflected from the document illuminated by the light source 11 and converting the direction to a horizontal direction reflected light. On the carriage 10, there are mounted a reflective mirror 13 to convert the horizontal direction reflected light reflected from the reflective mirror 12 to a vertical direction light beam and a reflective mirror 14 that converts the direction of the vertical direction reflected light reflected by the reflective mirror 13 to a horizontal direction reflected light that is in a direction opposite to that of the light reflected from the reflective mirror 12.

Numeral 15 is a light condensing lens for focusing light received from the reflective mirror 14, and numeral 16 is an image sensor comprised of a CCD to receive reflected light focused by the light condensing lens 15 and to convert it into electrical signals. The carriages 9 and 10, light source 11, reflective mirrors 12 to 14, light condensing lens 15 and image sensor 16 form the optical reduction reading means. On the output end of the image sensor unit 16, there is connected a lead wire, not shown in the drawings. Through this lead wire, the image signals of the light reflected from the document are converted and transmitted as electrical signals into an electrical device, such as a facsimile device and a copy machine unit which is not shown in the drawings.

The outside of the upper unit 2 is formed by a frame 17 and an outer cover 20. A pressure member 18 having resilience to lightly press and hold a document placed on the platen 5 is attached to the unit corresponding to the platen 5 on the main unit 1 below the frame 17. The pressure member 18 is formed of a layer with multiple holes having a thickness that allows resilient deformation and a soft, and a white film member covering the layer with multiple holes from the bottom surface. Numeral 17a is a document supply tray for stacking the documents to be fed one at a time for indicia to be read. The document supply tray 17a is formed to become low at the guide 6 side, and is angled thereto so that the documents travel smoothly to the guide 6. At the end of the platen side on the oblique surface of the document supply tray 17a, there are arranged a draw-out roller 50 to draw-out the documents placed upon the document supply tray 17a, a feed roller 22 to feed the documents drawn out by draw-out roller 50 one at a time to the guide 6 and a separating roller 19 to separate the documents pressed against the feed roller 22.

A part of the frame 17 on the right side of the feed roller 19 forms the flat portion 17b. Between this flat portion 17b and the outer cover 20 which houses the contact image sensor, described later, a feed entrance 21 is formed to receive the documents to transport them one at a time to the image sensor. Between a feed roller 22 and the guide 6, a pair of register rollers 40 and 23 is disposed to transport the document inserted from the feed roller 22 to the top of the guides 6 and 7. Also, between the feed rollers 19 and 22 and the discharge roller 8, a pair of upper and lower plate members 45 and 46 forms a document transport path 24 comprising a flat section 17b and an oblique section 17c that inclines toward the guide 6. Register rollers 19 and 40 are driven by a motor that is not shown in the drawings.

Furthermore, numeral 48 is a stopper to prevent the insertion of the documents transported from the document supply tray 17a into the transport path 24, which enables the feeding of the documents by retracting downward when feeding the documents.

A light source 25 for illuminating for reading the images on the back surface (surface facing upward) of the document transported into the transport path 24, a guide 27 which is a transparent glass plate for allowing the illuminating light and the light reflected from the back surface of a document sheet to pass therethrough, a SELFOC lens 26 to make the reflected light parallel, a line image sensor 28 that detects the light passing through the SELFOC lens and converts it into electrical signals, and a circuit board 30 form a single unit of the compact image sensor (second reading means, called CIS below) unit 29 in the contact reading means (second reading means) in the outer cover 20.

A plate-shaped backup guide 39 is fastened at a front side unit 39a in the direction of transport on the CIS unit 29 to form the CIS unit 29. The backup guide 39 is comprised of a rear section 39b that forms a transport path together with the fixed section 3b and abuts against the oblique section 17c in the transport path 24, a planar section 39c that forms a transport path with the guide 6 therebetween, and the front side unit 39a that is connected to the bottom of the CIS while slightly inclining downward at a substantially fixed angle. In other words, the backup guide 39 forms a reading path for reading a document with the optical reduction reading means between the fixed section 3b on the frame 3 and the guide 6.

The backup guide 39 is supported on a pair of rotation pins 31 (FIG. 3) that protrude from left and right side plates 42 on the outer cover 20, and the CIS unit 29 rotates using the rotation pins 31 as the fulcrum. One end of each of left and right tension springs 34 (FIG. 3) is attached to the rear section 39b in the direction of transport on the backup guide 39 to press the unit 29 downward and the other end thereof is attached to the spring support member 49 which protrudes to the side from the upper side of the left and right side plates 42.

Protrusions 35 are fixed to the left and right corners of the edges in the transport direction on the CIS unit 29. The protrusions 35 touch the upper surface of the main unit 1 thereby providing a gap for the reading path (first transport path) between the guide 6 and backup guide 39 that is larger than the gap for the reading path (second transport path) between the guide 7 and the bottom guide 27 of the CIS, so that the document sheet is transferred in a stable manner within the depth of focus for each of the reading path gaps, and the light of the image focussed on by each of the image sensors 16 and 28 can be received.

For example, the reading transport gap between the guide 6 and the flat portion 39c on the backup guide 39 is set at 2 mm, and the reading transport gap between the guide 7 and the guide 27 is set at 0.5 mm.

Furthermore, according to the image reading apparatus of the present embodiment, a plurality of sensors S1, S2 and S3 is installed to detect the position of the document and the presence or absence of images thereon, and a control circuit (not shown in the drawings) is formed to control the drives of the motors (not shown in the drawings), the movements of the carriages 9 and 10, the lighting and extinguishing of the light sources 11 and 25, and the image sensors 16 and 28 based on the detection signals of the sensors.

The operation according to this embodiment is explained below.

First, in the reading apparatus set as shown in FIG. 1, the backup guide 35 receives the moment of rotation in the counterclockwise direction by the tension springs 34 around the rotation pins 31. The CIS unit 29 mounted to the backup guide 39 is a floating structure that sags downward slightly when the outer cover 20 is opened. When the outer cover is closed, the protrusions 35 on the CIS unit 29 touch the upper surface of the main unit 1 to move it upward. This floating structure provides the correct gaps for the reading transport path (first transport path) between the guide 6 and the backup guide 39 and the reading transport path (second transport path) between the guide 7 and the guide 27 on the bottom of the CIS unit 29.

To feed the documents one at a time to the first and second image sensors to copy and transmit their data, the documents are stacked on the document supply tray 17a on the upper unit 2. These documents pass one at a time through the feed stopper 48, past the feed entrance 21 and are supplied to the guide 6 passing through the transport path 24 by the respective feed rollers 19, 22 and 40, 23. At this time, the carriages 9 and 10 in the main unit 1 are stopped at the furthermost left side position in FIG. 1.

After passing a predetermined time since the document sensor S2 detects the leading edge of a document sheet, the control circuit recognizes that the document has reached the top of the guide 6 and the control circuit lights the document with the light from the lighting source 11 with the carriages 9 and 10 stopped at their stopped positions. The illuminating light passes through the guide 6 which is a transparent glass plate, illuminates the front side of the document and the light reflected from the front surface of the document is input into the light condensing lens 15 through the reflective mirrors 12, 13 and 14. The reflected light input to the light condensing lens 15 collects the image at the image sensor 16 and a reduced image of the front surface of the document (surface facing downward) is obtained in the image sensor 16 by the light condensing lens 15. The image sensor 16 sends the electrical signals that correspond to the reduced image to the electronic device main unit based on the control signals coming from the control circuit and the electronic device generates or transmits the images based upon this electrical signal.

Because the gap with the guide 6 and the parallel portion 39c is set according to a comparatively large depth of focus for the optical reduction image sensor, it is possible to transport the documents to the guide 6 comparatively easily without problems, such as paper jams.

Next, the document moves above the guide 7 that opposes the contact image sensor. In this case, the guide 6 and the guide 7 are structured into one unit and the upper surfaces of the guide 6 and the guide 7 form the same flat surface so they provide a flat surface to enable the smooth transport of the documents.

Because the front oblique portion 39a extends obliquely downward from the parallel portion 39c and is connected to the CIS contact lens 27, it guides the document by smoothly pushing it downward toward the top surface of the guide 7.

In this way, the document is fed into the gap between the contact lens 27 and the guide 7. However, because this gap is set to the depth of focus for the contact image reading means, it is possible to form a sharp image on the image sensor 28.

The control circuit recognizes the arrival of the document to the reading position on the guide 7 by the passing of the second time from the detection of the leading edge of the document sheet by the document sensor S2. Then, the light source begins illuminating the document. Light from the light source 25 passes through the contact lens 27 and illuminates the back surface of the document. Light reflected from the back surface of the document again passes through the contact lens 27, is made parallel by the SELFOC lens 26 and is then received at the CCD image sensor 28. The image sensor 28, using the control of the control circuit, outputs an electrical signal that corresponds to the reflected light to the electronic device of the main unit which regenerates or transmits the images on the back surface of the document. The document, front and back surfaces of which are read, is discharged from the upper lid 20 and is stacked on the discharge tray 4 by the pair of discharge rollers 8 and 32.

The above operations are done for reading both surfaces of the document. The following relates to the reading of a thick document placed on the platen 5.

The document is placed on the third platen 5, and when an operation start switch to indicate the starting of the copying or transmission of signals for the document placed upon the third platen 5 is pressed, the control circuit outputs a control signal to move the carriages 9 and 10 which can be moved in the right and left directions in FIG. 1 by a motor that is not shown in the drawings. The control circuit simultaneously transmits a control signal to the light source 11 to illuminate and the light source 11 continues to illuminate the document surface on the platen 5 as the carriage 9 moves in the right direction of FIG. 1. Because the platen 5 is made of transparent glass, the illuminated light from the light source 11 passes through the platen 5 to illuminate the surface of the document on the platen 5. The light reflected from the front surface of the document passes through the platen 5 again, and in the same way as with the guide 6, is reflected by the reflective mirrors 12, 13 and 14. The light passes through the light condensing lens 15 to create an image on the image sensor unit 16 as a reduced image. Electrical signals that correspond to the reduced image are output from the image sensor 16 and the image is regenerated or transmitted based on these electrical signals by the electronic device.

According to the embodiment of the invention, when reading the front surface of the document, the document is transmitted into a gap with a large tolerance for the depth of focus in the optical reduction reading means, and when reading the images on the back surface of the document, the document passes through the reading path of the small gap matching the depth of focus of the CIS reading means to read the document.

Therefore, it is possible to dramatically reduce the possibility of document jams when comparing with the case where the transport path gaps above both reading means are formed to match the depth of focus of the CIS reading means, as taught in Japanese Patent Publication No. 11-32164.

Furthermore, there is no need to establish transport rollers on the back side of the CIS reading means, as in Japanese Patent Publication No. 9-46484, so it is possible to reduce the number of transport rollers without a reduction in the reading accuracy of both reading means. Also, because the documents can be easily received even if it is fed in a vertically oscillating condition in a comparatively large gap at the top of the optical reduction reading means, it is possible to transport the documents with stability to the CIS reading means and to accurately read the image thereupon.

Because the guide 6 and the guide 7 comprise one unit that forms one surface without rollers or forming any space therebetween, the documents can move smoothly over the guide 6 and the guide 7, and at the same time can form an extremely small shape in the horizontal direction of the image reading apparatus.

Figure 5:
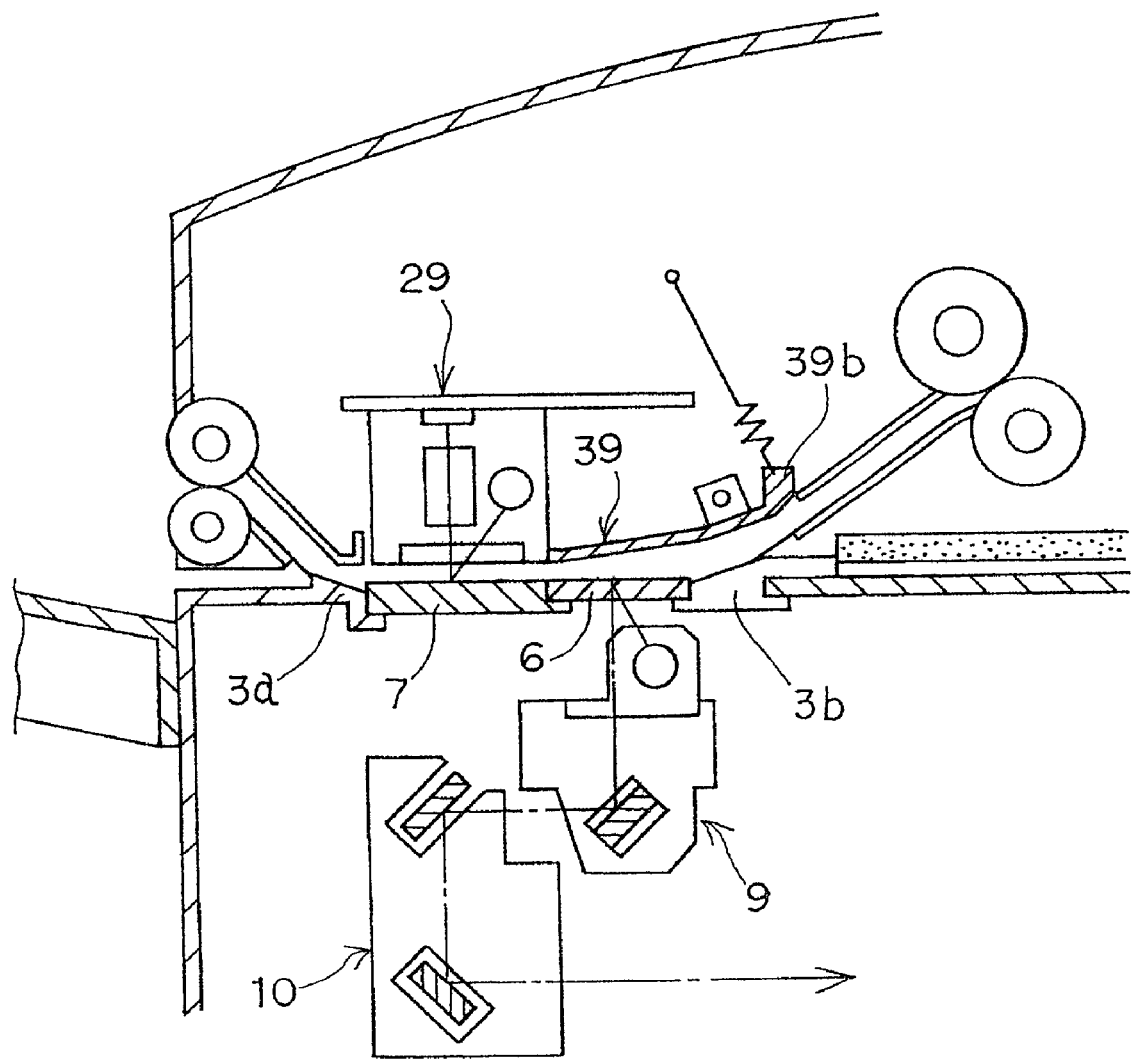
FIG. 5 is an enlarged sectional view of the essential members as in FIG. 1 showing a second embodiment of the invention.

The backup guide 39 is formed obliquely downward as the guide means, though the embodiment is by no means limited to that. FIG. 5 shows the guide means in the second embodiment. Portions of the second embodiment that are the same as those of the first embodiment employ the same numbers, and their explanations are omitted. The backup guide 39 here is formed to continue from the oblique portion of the rear section 39b in the transport direction and the entire portion is obliquely set downward toward the bottom of the CIS unit 29. In that case, the maximum size of the gap on the guide 6 is obviously set within the depth of focus. Therefore, the rear section 39b on the backup guide 39 smoothly transfers the document whose one edge has been received, to the guide 7.

Figure 6:
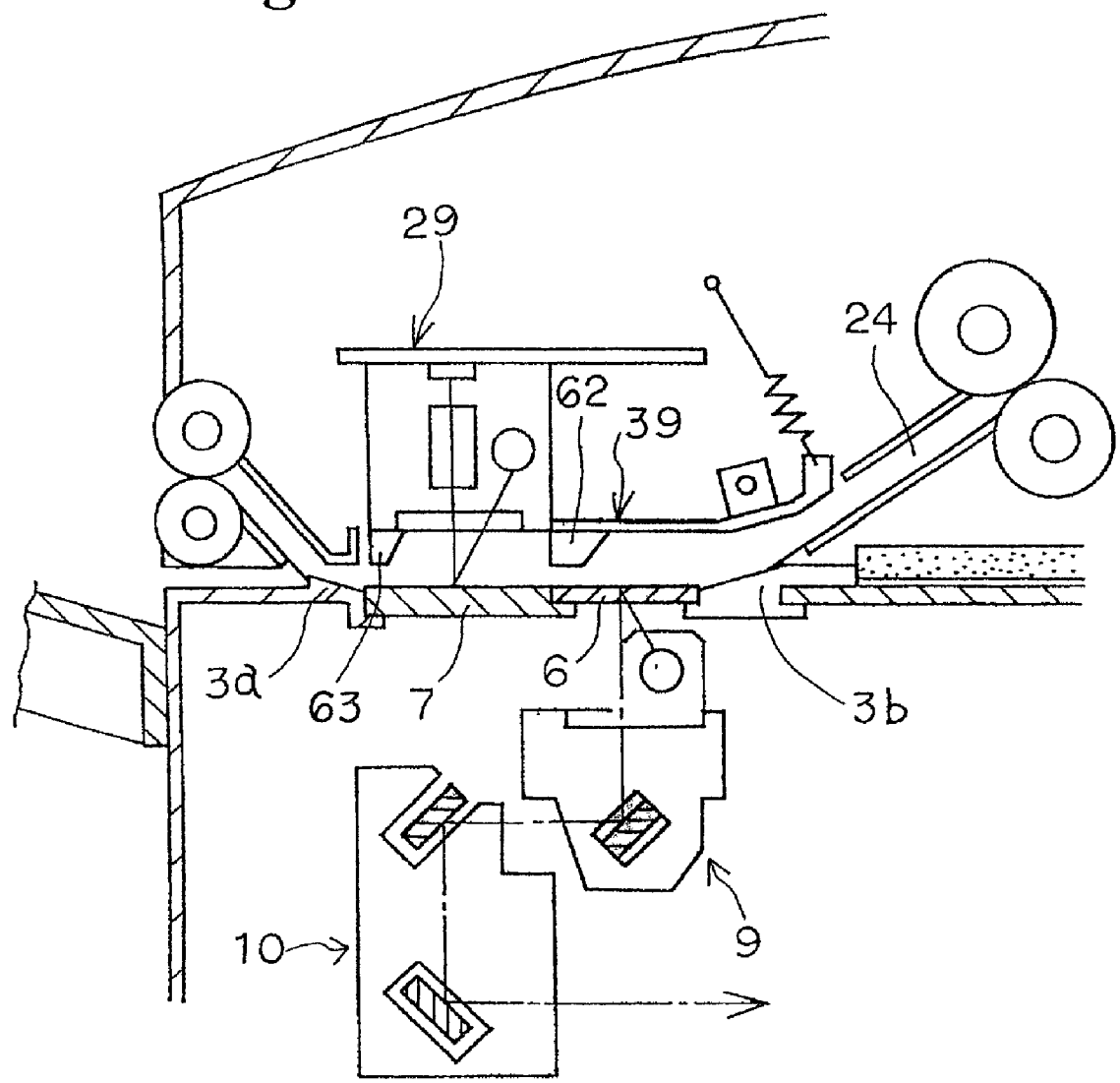
FIG. 6 is an enlarged sectional view of the essential members as in FIG. 1 showing a third embodiment of the invention.

FIG. 6 shows the guide means according to a third embodiment. Portions of the third embodiment that are the same as those of the first embodiment employ the same numbers, and their explanations are omitted. Here, the portions excluding the rear section 39b in the transfer direction on the backup guide 39 are formed horizontally to be in the same plane as the bottom of the CIS unit 29, but a rib shaped protrusion member 62 having the same width as the bottom of the CIS side on the backup guide 39 extends therefrom and forms a gap between its leading edge and the guide 7 for the magnification type optical system image sensor. In this case, it is also possible to form a second protruding member 63 having substantially the same shape as this protruding member 62 on the front side of the bottom of the CIS unit 29. This second protruding member securely guides and feeds the document on the guide 7 to the depth of focus, and is effective in easy and sure discharge from the guide 7 to the discharge rollers.

Figure 7:
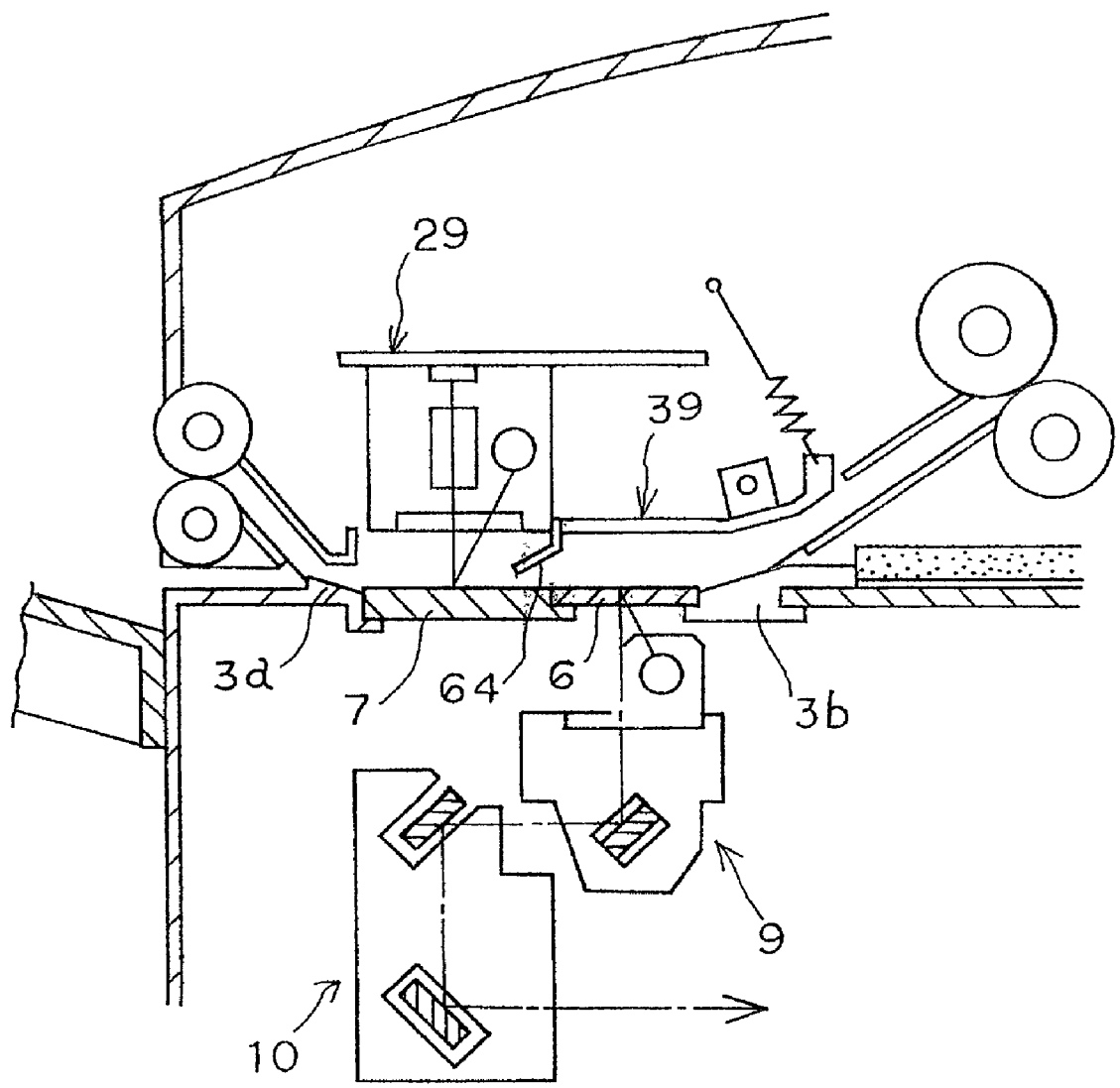
FIG. 7 is an enlarged sectional view of the essential members as in FIG. 1 showing a fourth embodiment of the invention.

FIG. 7 shows the guide means according to the fourth embodiment. Portions of the fourth embodiment that are the same as those of the first embodiment employ the same numbers, and their explanations are omitted. The difference to the example of FIG. 6 is that instead of the protruding members 62 and 63, from the gap between the backup guide 39 and the CIS bottom, a resilient member or Mylar 64 is extended obliquely downward toward the guide 7, and the gap between the leading edge thereof and the guide 7 is the same as that formed by the protruding member 62 in FIG. 6. In this case, it is also acceptable to form a second resilient member or Mylar in the same way as the second protruding member 63 or resilient Mylar 64 to the bottom of the CIS unit 29, as shown in FIG. 6.

In the third and fourth embodiments, by using the protruding members or resilient Mylar on one side of the document reading path to reduce the gap of a part of the reading path, the document sheet is restricted toward the guide 6 and guide 7 formed along the same horizontal plane, and is guided along the guide 6 and guide 7. Also, it is not necessary that the contact glass surface for the CIS unit is located close to the guide 7, the machine can be designed relatively freely, and it is effective in handling static electricity.

As described above, the present invention comprises the guide 6 arranged in a position for reading one surface of the document, and the guide 7 arranged in a position for reading the other surface of the document, the surfaces of the guides or platens forming one surface. Also, the gap in the document sheet reading transport path on the guide 6 surface is larger than the reading transport path gap formed between the guide 7 surface and the second reading means. The height of the transport path gaps of the document sheet transported toward the guide 7 from the guide 6 is regulated and gradually reduced by forming the guide means on the upper side of the transport path to thereby reduce the possibility of document jams on the platen side, to make it easier to transport the document sheets to the guide 7 side and to obtain finely accurate image data on both sides of the document.

Also, the use of transport rollers is minimized to enable a simple structure and a lightweight and compact apparatus.

While the invention has been explained with reference to the specific embodiments of the invention, the explanation is illustrative and the invention is limited only by the appended claims.

What is claimed is:

1. An image reading apparatus for reading indicia on two surfaces of a document automatically at a time, comprising:
a document supply tray for placing a document to be fed for reading,
document feed means for feeding the document on the document supply tray for reading,
discharge means for discharging documents after reading, and
a reading station situated between the document supply tray and the discharge means and including first reading means for reading one surface of the document, second reading means for reading the other surface of the document, transparent first guide means for guiding the document so that said one surface of the document is read by the first reading means, second guide means formed at a side opposite to the first guide means to form together with the first guide means a first path having a predetermined gap, said second guide means having an oblique portion at a side of the second reading means to incline obliquely toward the first guide means to gradually reduce a distance to the first guide means, transparent third guide means for guiding the document so that the other surface of the document is read by the second reading means, and fourth guide means formed at a side opposite to the third guide means and connected to the first guide means so that the first and fourth guide means form flat and continuous guide surfaces thereon, said fourth guide means forming a second path together with the third guide means to allow the document to pass from the first path to the second path, said second path having a gap smaller than said predetermined gap.

2. An image reading apparatus according to claim 1, wherein said second guide means is a backup guide plate having the oblique portion to guide the document toward the third guide means.

3. An image reading apparatus according to claim 1, wherein said second guide means is a backup guide plate having a guide member protruding into the first path to form the oblique portion for guiding the document toward the second path.

4. An image reading apparatus according to claim 2, wherein said first reading means comprises a light source for illuminating the document, a lens for collecting light, a plurality of mirrors for directing light from the document to the lens and an image sensor for converting the light collected by the lens into electrical signals, and said second reading means comprises a light source for illuminating the document, an SELFOC lens for collecting light and an image sensor having a sensor array for converting the light collected in the lens into electrical signals.

5. An image reading apparatus according to claim 1, wherein said third guide means is formed slightly away from the first guide means at a downstream side in a document transport direction.

6. An image reading apparatus according to claim 5, wherein said first guide means and said third guide means are formed at positions where simultaneous reading of the indicia on the document is possible by the first and second reading means.

7. An image reading apparatus according to claim 1, wherein said reading station further includes supporting means for swingingly supporting the second guide means and third transparent guide means.

8. An image reading apparatus according to claim 7, wherein said second guide means and said third guide means are formed as one unit.

9. An image reading apparatus for reading indicia on two surfaces of a document automatically at a time, comprising:
first reading means formed of an optical reduction reading means for reading one surface of a document, second reading means for reading the other surface of the document situated adjacent to the first reading means, said second reading means being formed of a contact image sensor, first contact glass means situated adjacent to the first reading means for reading the one surface of the document by the first reading means, second contact glass means situated adjacent to the second reading means for reading the other surface of the document by the second reading means and located at a side opposite to the first contact glass means, and a linear transport path for passing the document to be read by the first reading means and the second reading means defined by the first contact glass means and the second contact glass means, said transport path including a first path having a determined gap and a second path having a gap narrower than said determined gap to allow the document to pass from the first path to the second path.

10. An image reading apparatus according to claim 9, further comprising a supply tray to place the document to be read by the first and second reading means; and a supply path to guide the document from the supply tray and formed obliquely toward the transport path.

11. An image reading apparatus according to claim 9, wherein said second contact glass means is formed slightly away from the first contact glass means at a downstream side in a document transport direction.

12. An image reading apparatus according to claim 11, wherein said first contact glass means and said second contact glass means are formed in positions where simultaneous reading of indicia on the document sheet is possible by the first and second reading means.

13. An image reading apparatus according to claim 9, further comprising a third contact glass means for placing a document arranged adjacent to the first contact glass means, at least one section of said first reading means moving to read the document immovably placed on the third contact glass means.

14. An image reading apparatus according to claim 9, wherein said first path includes a backup guide plate partly disposed above the first contact glass means, said backup guide plate having an oblique portion so that a distance from the first contact grass means to the oblique portion is gradually reduced, said oblique portion communicating with the second path.

15. An image reading apparatus according to claim 14, wherein said first contact glass means has a continuous flat surface.

* * * * *